May 2, 1961 H. W. SMITH 2,982,862
BOTTLE CAP DETECTOR
Filed Dec. 31, 1959 2 Sheets-Sheet 1
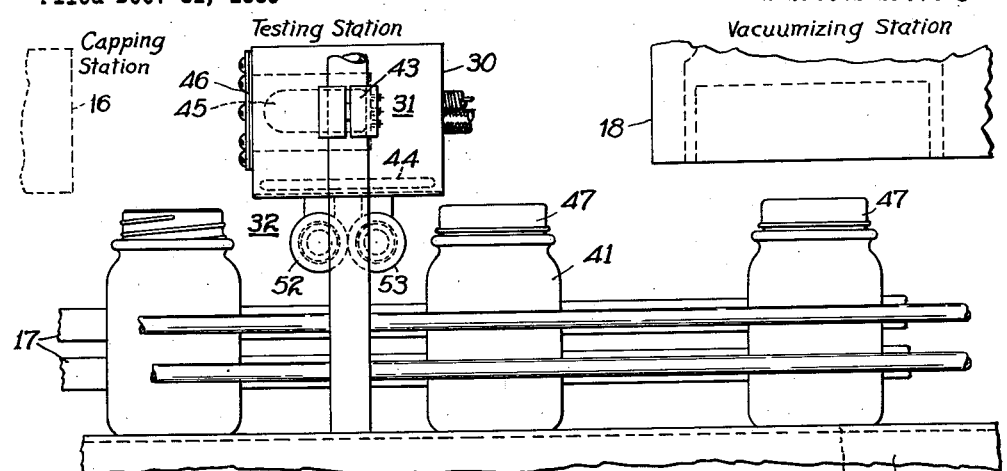
Fig. 2.
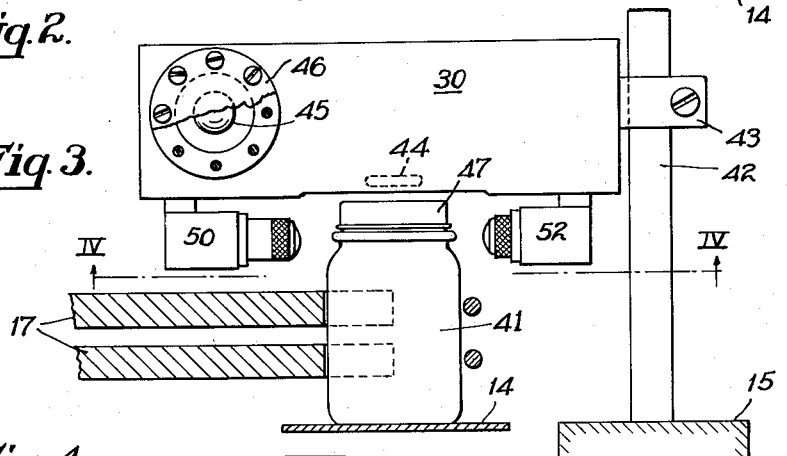
Fig. 3.
Fig. 4.
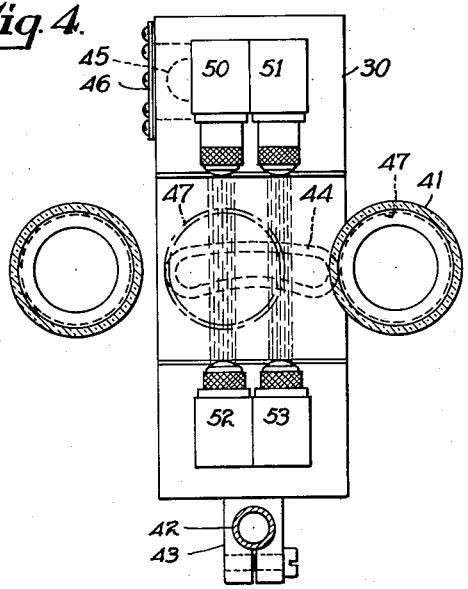
Fig. I.
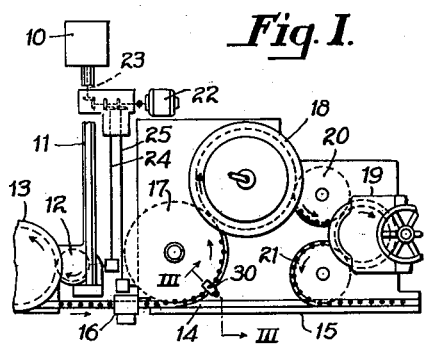
INVENTOR.
Herman W. Smith
BY
Howard B. Funk
ATTORNEY

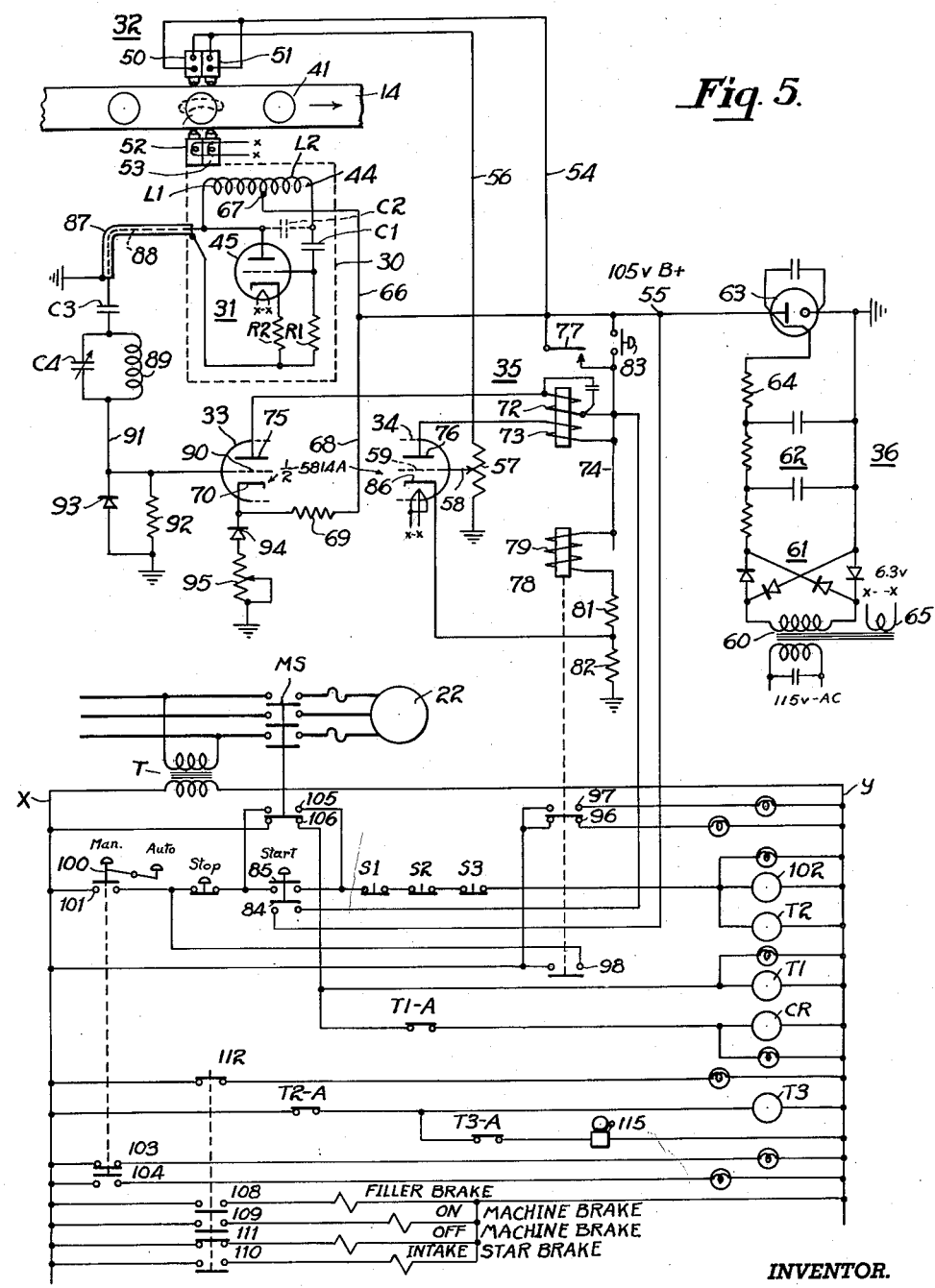

United States Patent Office 2,982,862
Patented May 2, 1961

2,982,862

BOTTLE CAP DETECTOR

Herman W. Smith, Parma, Ohio, assignor to Aluminum Company of America, Pittsburgh, Pa., a corporation of Pennsylvania Filed Dec. 31, 1959, Ser. No. 863,151

7 Claims. (Cl. 250—223)

This invention relates in general, to detecting apparatus, and more particularly to an electronic bottle or container-cap detector apparatus for detecting the absence of closure caps on filled containers moving in a high speed packaging or processing line.

Heretofore, cap detector apparatus made in accordance with the teachings of the prior art have been restricted in their use to slow speed service or to the detection of closures or caps made from magnetic material and, hence, have been unsuited for use in current high speed packaging lines where speeds in excess of 600 containers or bottles per minute are the rule and, in addition, the containers have been capped with closures made from non-magnetic metal, of which aluminum is a prime example. Moreover, prior electronic detectors have been complicated in circuitry and failed to guard against the passage of uncapped containers in the event of failure of any of its components or loss of power thereto.

Accordingly, it is the aim of the present invention to provide an electronic cap detector apparatus which is simple in construction and employs only a few component parts, is positive and reliable in operation at any bottle or container speed and is capable of sensing the presence or absence of caps of magnetic or of non-magnetic metals with equal facility; which shall be possessed of "fail-safe" characteristics in case of failure of any of its components or loss of power thereto and which shall afford effective and positive missing cap protection to the packaging line on which it is installed.

A further object of the invention is to provide an electronic cap detector apparatus incorporating a coincidence output relay circuit which is normally energized and controlled by a container detector or sensing circuit and a cap detector or sensing circuit so as to effect output relay operation for signalling and/or control purposes only responsively to appearance of an uncapped container at the location of the detector or to loss of power to the detector.

Still another object of the invention is to simplify and improve generally the structure and operation of apparatus of the character referred to.

One form of apparatus by which the invention may be practiced is shown in the accompanying drawings, wherein:

Fig. 1 is a generally diagrammatic plan view of a typical layout of a high speed packaging or processing line with the detector head of the detecting apparatus of the invention in operative relation thereto;

Fig. 2 is a view in side elevation, on an enlarged scale, of a portion of the mechanism of Fig. 1, with the detector head in end elevation for clarity of illustration, and showing an uncapped jar or container approaching the detecting station;

Fig. 3 is a sectional-elevational view on the same scale as Fig. 2, looking in the direction of the arrows on line III—III of Fig. 1;

Fig. 4 is an inverted plan view of the detector head taken on the line IV—IV of Fig. 3, and Fig. 5 is a diagrammatic representation of the detector apparatus and circuits as applied to a motorized line of the type shown in Fig. 1.

In the food and beverage packing industries, automatic, high speed packaging lines are used in which, in general, glass containers, travelling in single line progression, are filled with a given product and hermetically sealed with metallic closure caps. Capping failures are not impossible and give rise to difficulty, particularly in regards to causing contamination of the prevailing sterile conditions which purity and high quality standards demand, especially in the case of packaging some food products, such as specially prepared baby and junior foods and the like in glass jars or containers having screw-on caps whose threads are conformed to those on the containers by means of pressure roller discs of a thread rolling unit or mechanism in the packaging line. Such containers sealed with screw thread caps are particularly desired because of the advantage possessed thereby of affording easy opening of a container without cap deformation or danger of glass chipping and of permitting airtight resealing of the container for keeping unused food portions or second helpings moist and tasty during refrigerator storage thereof until another feeding time. In such a packaging line, use of cap detecting apparatus is satisfactory only if it is of utmost dependability and reliability in service, so as to prevent an uncapped container from reaching the thread rolling unit and possibly being chipped or scored by the pressure discs, this being afforded by the present invention, even under component failure conditions, which operates to effect stoppage of the line.

While herein shown and described in conjunction with an exemplary packaging line for baby foods and the like, it will be understood that the invention is not limited thereto.

Referring to Fig. 1, showing a typical baby food packaging line layout, relatively small glass jars or containers are, in a continuous succession of high speed, automatic operations, washed and sterlized in a washer mechanism 10, delivered by line conveyor 11 to the intake star 12 of a rotary multiple pocket filler 13 and filled with food product as they progress to the outlet side of the filler. From here, they are conveyed, as by an extension of the line conveyor 14 of a sealing machine 15, in spaced order past a capping station 16, each to receive from an overlying cap dispenser a plain-skirt closure cap loosely on the mouth thereof in passing to intake star 17 of the sealing machine. This machine is equipped with a rotary multiple pocket steam vacuumizing unit 18 to which the intake star delivers the containers for vacuum sealing the caps thereon and a rotary multiple head thread rolling unit 19 to which a transfer star 20 delivers the containers from unit 18. By means of pressure roller discs at each head of the thread rolling unit, conformed threads are rolled in the skirt of each cap, according to the method disclosed in Sharp Patent 1,684,-892, thereby tailoring the cap threads to the container threads with the cap in tight sealing relation on the container. A take-out star 21 receives the containers from the threading unit and moves them back onto the line conveyor 14 for delivery onto a take-out conveyor (not shown), whereby they are conveyed past any other desired units in the line, such as marking and testing units, and delivered to any suitable point, such as a marshalling or collecting area. The washer, filler and sealing machine and associated conveyors may be actuated in synchronism by any suitable means, here illustrated in an effective form as an electric drive motor 22 operatively connected thereto through bevel gearing and shafts 23, 24 and 25, respectively, and the cap dispenser may be driven by suitable connection with the sealing machine. In accordance with conventional practice, the drive connections to the washer, filler and cap dispenser may each include a suitable clutch having an electric switch controlled thereby, which switches S1, S2 and S3, as shown in Fig. 5, may be disposed in series in the starting circuit of motor 22 so as to interlock the operation of the motor with each of these mechanisms. Since the mechanisms constituting the thus generally described packaging line may be of various well-known types and in themselves form no part of the present invention, it is considered unnecessary to describe them further.

The apparatus for detecting uncapped containers comprises detector head 30 carrying cap and container detectors or sensing means 31 and 32, and a coincidence relay circuit controlled by the latter, which circuit (Fig. 5) comprises two electron tubes 33 and 34 which are preferably the respective halves of a dual triode tube, such as a 12AU7 or a 5814A tube, and electro-magnetic switch means 35 controlled by the electron tubes. These latter elements, as well as a D.C. power supply unit 36, are mounted in a cabinet (not shown) from which a suitable cable extends to the head 30 for connection with the electrical components of the cap and container detectors.

As shown in Figs. 1 through 4, the head 30 is disposed to overlie the travel path of the containers 41 at any suitable testing station or point intermediate the capping station 16 and the vacuumizing station 18. It may suitably be supported in this position as by means of a post 42 upstanding from the plane top of the sealing machine 15 and a split clamp 43 projecting from one end of the head and held to the post by a clamping screw, as indicated. Any other suitable mounting for the head may be used. The head contains a complete electronic oscillator hermetically sealed therein which constitutes the cap detector 31. The oscillator includes a two-section or tapped inductance coil 44 and a triode tube 45; in fact, the head is preferably an epoxy resin potting material in which the oscillator is embedded, only a recess covered by a gasketed cover plate 46 being provided therein for placement of tube 45 in its terminal socket and replacement, as required in service. This complete embedment of the oscillator is conducive to stable operation thereof despite the adverse temperature and humidity conditions and changes in which it is required to operate.

Coil 44 is of generally elongated elliptical form, closely adjacent to the underside of the head and generally parallel to the travel path of the containers. It will be observed that caps 47 on the passing containers will traverse the coil lengthwise in clearance relation or in close proximity thereto and will be detected by effectively changing its inductance and thereby lowering the frequency of the oscillator. The containers are spaced apart a distance preferably slightly greater than the coil length, as shown, in order to provide a timing gap or interval between the operation of the respective cap and container detectors, as hereinafter described.

The container detector 32 is carried on the underside of head 30 and is of a radiant energy responsive type which avoids physical contact with the containers and permits their high speed travel without jamming the controls. For effective simplicity, it comprises two light-sensitive devices or photo-conductive cells 50—51, each having two identical non-polarized electrodes, disposed alongside each other at one side of the container path and midway of the length of coil 44 and their individual light sources 52—53 at the other side of the container path, to provide, in effect, a broad-width photo-cell unit. This makes it possible to reduce the length of the coil 44 for reasons that will hereafter appear. Normally, the photo-cells provide a continuous output signal voltage which is dropped to minimum value only during the interval when both light beams are simultaneously interrupted or broken by a passing container. These two cells, as shown in Fig. 5, are connected in parallel, one side thereof being connected by wire 54 to the positive voltage terminal 55 of power supply unit 36, and the other side being connected through wire 56 to one end of a potentiometer 57 having its other end connected to ground and its sliding contact 58 connected to the control grid 59 of tube 34. The effect of only one light beam being broken is the same as if neither is broken, so that the grid of tube 34 is maintained at a relatively high positive potential which results in the tube conducting until both light beams are interrupted by the interposed container.

The full effect of a cap 47 upon the coil 44 is not experienced until the cap reaches substantially the position shown in dot-dash lines in Fig. 4, where it is fully under the coil, at which cap-coil relationship only the front or first light beam from source 52 to cell 50 is interrupted by the interposed container. Thus, the presence of a cap is detected before the second light beam to the cell 51 is broken. It will also be seen that, subsequent to both light beams being interrupted to cause operation of the container detector, the light beam to cell 50 is re-established while the cap is effectively under the coil 44 at the rear end thereof, thereby restoring the container detector to its normal condition before the cap detector oscillator returns to its normal higher frequency output. In other words, off-on operation of the container detector is intermediate or interposes the operation of the cap detector. In this manner, sequential operation of the cap and container detectors, with automatic timing of their operation, is effectively and simply obtained while permitting the use of a relatively short length coil 44 for reduced inter-turn capacitance and oscillator operation at optimum normal frequency of about one-half megacycle. While subject to variation, the length of the coil will be made approximately equal to the container diameter plus the center-to-center distance between the two cells 50—51. This results in effective detection of non-magnetic or magnetic metal caps.

Referring to Fig. 5, the power pack or supply unit 36 for the detecting apparatus may suitably comprise transformer 60, full wave bridge rectifier 61, filter network 62, and cold cathode, voltage regulating tube 63, which, together with resistor 64, serves to regulate the direct voltage output to 105 volts, for example, regardless of A.C. supply voltage fluctuations and/or changes in load current. Transformer 60 may be designed for excitation from a usual 60 cycle A.C. supply circuit at, say, 115 volts. It also has a low voltage winding 65 to energize the filaments of the light sources 52—53 and the cathode heaters of the electron tubes, these connections being conventionally indicated by the symbols X—X. The negative side of the direct voltage power supply connects to the mounting chassis, indicated by the conventional ground symbol, and the positive side connects to the power terminal 55. From here, it connects through wire 66 to tap 67 of inductance coil 44 and through wire 68 and voltage dropping resistor 69 to the cathode 70 of tube 33.

In accordance with an important feature of the invention, the switch means 35 comprises a sensitive direct current relay having two separate operating coils 72 and 73 mounted on one relay frame. If either, or both, coils are energized the relay will pick up and remain up until both coils are de-energized at the same time. Both coils are connected at one end to a D.C. conductor 74 and are connected at their other ends to the anodes 75 and 76 of tubes 33 and 34, respectively. Conductor 74 may be continuously energized only so long as relay 35 is maintained energized to hold its normally open contacts or switch 77 in closed position, which contacts interconnect power terminal 55 and conductor 74, when closed. During normal operation, relay 35 is energized and conductor 74 is continuously energized. By using two separate coils on relay 35, stable and reliable operation of the tubes 33 and 34 is achieved because the plate voltage on either tube remains unaffected by the operation of the other tube. In addition, the relay has to operate, or drop out, only when an uncapped container is detected, which is not very often. The circuit arrangement which is provided has the advantage of affording fail-safe protection, in that failure of any component of the electrical apparatus or power failure thereto will result in dropout of relay 35 and deenergization of conductor 74.

In order that signalling and/or control burden may be removed from relay 35, a heavier duty control relay 78 is provided, whose coil 79 is connected to conductor 74 and to ground through a potential divider comprising resistors 81 and 82. This relay picks up or is energized whenever relay 35 is energized, which operation may be effected by momentary closure of the contacts of a reset switch 83 or the contacts 84 of a start switch 85 in the starting circuit of motor 22, both of which sets of contacts are in parallel with the contacts 77 of relay 35.

The cathode 86 of tube 34 is connected to ground through the lower biasing resistor 82 of the potential divider. The photo-cells 50—51 and potentiometer 57 form a potential divider between power terminal 55 and ground, so that with light from sources 52—53 impinging on these cells, or either of them, a low impedance path is provided through the cells, and the potential on grid 59 is a positive value which results in the tube conducting, if its anode-cathode circuit is energized. This circuit is completed by depressing reset switch 83 or the start switch, thereby energizing conductor 74 from power terminal 55 and tube 34 conducts, which energizes coil 73 and relay 35 closes its contacts 77 to maintain the energization of conductor 74. Parallel relay 78 also energizes. When both cells are darkened by an interposed container, their impedance is high and thereby the potential on grid 59 is dropped to such a low value that tube 34 does not conduct and relay coil 73 deenergizes. However, the relay 35 will not drop out if there is a cap on the cell-darkening container, because, as heretofore mentioned, the cap detector is operative to cause energization of coil 72 of the relay before the container detector causes deenergization of coil 73.

The oscillator 31 is generally of the Hartley type. Section L1 of the coil 44 is connected to the plate or anode of tube 45 and is the main oscillating plate coil, and section L2 is connected through direct current blocking condenser C1 to the grid of the tube and is the grid feed-back coil. The grid and cathode are connected through biasing resistors R1 and R2, respectively, to ground through the grounded shield 87 of a coaxial cable whose shielded conductor 88 is connected at one end to the oscillator plate circuit. Condenser C2 is the oscillator tank capacitance and is, in the present instance, composed of the capacity between conductors in the length of cable which connects the detector head to the chassis in the control cabinet, and thus is shown in dotted lines. Sections L1 and L2 may suitably comprise about 60 and 30 turns, respectively, of suitable conductor wire. Normally, the oscillator operates at a frequency of about 475 kilocycles, but when a metal cap comes in position under the coil, it has the effect of lowering the frequency to about 425 kilocycles, and in both cases is a sine wave voltage signal.

The oscillator output signal passes through a direct current blocking condenser C3 and into a wave trap comprising parallel inductance coil 89 and tuning condenser C4, by which the trap is tuned to the normal operating frequency of the oscillator. Since the wave trap is resonant at this frequency, it presents a very high impedance to the signal and very little voltage appears at the grid 90 of tube 33 to which the wave trap is connected through wire 91. Grid 90 is connected to ground through resistor 92, across which silicon diode rectifier 93 is connected polarity-wise in such direction that only the positive halves of the signal voltage appears on the grid. Tube cathode 70 is connected to ground through Zener diode 94 and potentiometer 95 which provides a negative bias on tube 33 which normally prevents its conduction and relay coil 72 is deenergized. By using the Zener diode, the bias is maintained substantially constant and the potentiometer 95 adds some additional bias and enables its value to be easily adjusted so as to select the operating point for the cap detecting circuit. When a cap is under coil 44, the oscillator frequency is lowered. The wave trap is not tuned to this lower operating frequency and will now pass a voltage which is ten fold greater than its resonant frequency output. Due to this increased voltage on grid 90, tube 33 conducts and relay coil 72 energizes.

In order to energize relay 35 initially with the detector equipment energized, either reset switch 83 or start switch 85 at the motor control station may be depressed, thereby energizing the normally dead or deenergized conductor 74 to complete the anode-cathode circuit of tube 34. With light shining on the photo-cells 50—51, the tube grid 59 is at its high potential and tube 34 conducts. Current flow through the tube energizes coil 73 and relay 35 closes its contacts 77 and seals itself in through these contacts. Relay 78 also picks up and stays in so long as conductor 74 remains energized. Its contacts 96—97 may be connected to indicating lights to show the "on" and "off" condition of the detector apparatus. Its contacts 98 control the starting circuit of motor 22.

When relay contacts 98 close, they complete a circuit around a selector switch 100 having contacts 101 connected in a conventional motor start-stop circuit which includes the operating coil 102 of a magnetic motor starter switch MS. Selector switch 100 in "automatic" position opens its contacts 101 and permits operation of the motor and the packaging line through the by-pass contacts 98 under control of the detector apparatus. In its "manual" position, contacts 101 are closed, thereby cutting the detector apparatus out of service. Contacts 103 and 104 of switch 100 may control the circuits of indicating lights to show whether the switch is in either its "automatic" or "manual" position.

Assuming switch 100 to be in "automatic" position, as shown, depressing start switch 85 will cause the detector apparatus to be energized, with relays 35 and 78 sealed in, as above described, and also will cause the motor 22 to be started by connecting coil 102 of switch MS across the supply lines X—Y, fed from a suitable A.C. source through a transformer T. A timing relay T2, in parallel with coil 102, also energizes. Switch MS closes so that motor 22 is fed with power to drive the packaging line, and its contacts 105 and 106 completes a holding circuit for coil 102 around the start switch 85 and opens the circuit of a timing relay T1 and the branch circuit of control relay CR, respectively. Both relays deenergize and so remain until the motor is to be deenergized. Relay T1 at its slow-to-open contacts T1–A closes a point in the branch circuit of relay CR. Relay CR controls the operation of power brakes on the filler 13, the sealing machine 15 and the intake star 17, deenergizing the operating solenoids of such brakes by opening its contacts 108, 109 and 110, respectively, and closing its contacts 111 to energize the sealing machine brake "off" solenoid, all as indicated at the lower portion of Fig. 5. Normally closed contacts 112 of relay CR may be connected to an indicating light and close to show that the brakes are off. Relay T2, heretofore mentioned, energizes with coil 102, and opens its slow-to-close contacts T2–A to deenergize timing relay T3 and this relay drops out to close its slow-to-open contacts T3–A in the circuit of an alarm bell 115. This alarm, when subsequently actuated, signals the detection of an uncapped container at the testing station, along with stoppage of the line under the control of the detecting equipment.

The operation of the detecting apparatus briefly is as follows:

At intervals between containers, light falls on both photo-cells and continues the conduction of tube 34 to keep relay coil 73 energized. The cap detecting oscillator is operating at its normal frequency at this time, and its output voltage is reduced by the resonant wave trap to such low value that tube 33 is cut off and relay coil 72 is deenergized. As a capped container enters under the testing head 30, it first cuts off light to the front cell 50, but before the light to the second cell 51 is cut off, the cap comes fully under the coil 44 and the reaction therebetween lowers the oscillator frequency which results in about a tenfold increase of voltage at the output of the wave trap and, consequently, at the grid of tube 33. This tube conducts and relay coil 72 energizes. As the container moves further under head 30, the light beams to both cells 50—51 are interrupted by the container, whereby the voltage impressed on the grid of tube 34 drops to such value that this tube becomes non-conducting and relay coil 73 deenergizes. Relay 35 remains picked up, however, because its coil 72 is energized. Condenser C5 may be connected across coil 72 to avoid relay chatter, if required. Further progress of the container under the head allows light to fall on cell 50 thereby causing tube 34 to conduct and re-energize coil 73 at which time the cap on the container may be substantially at the rear or discharge end of the coil 44. Then, as the container moves away from the head, the cap's effect on coil 44 disappears and the oscillator returns to its normal operating frequency, the grid voltage of tube 33 drops to its minimum value and the tube ceases to conduct, whereupon relay coil 72 deenergizes. Coil 73 now keeps the relay 35 picked up. The testing cycle repeats itself for each container.

In case a container appears at the detector head, to start the testing cycle, and it lacks a cap, the light beams will be successively interrupted, as before, and render tube 34 non-conducting for the interval that both beams are interrupted, so that coil 73 is deenergized. However, due to the absence of a cap to cause the oscillator to change its frequency, tube 33 does not become conductive and coil 72 remains deenergized. Since both coils are deenergized, relay 35 drops out, opening its contacts 77 and disconnecting conductor 74 from the power source 55. Relay 78 deenergizes and its contacts 98 open, whereupon quick stoppage of the packaging line and sounding of the alarm are effected.

To do this, contacts 98 open the motor starting circuit, whereupon switch MS drops out, due to deenergization of its operating coil 102, and disconnects motor 22 from its power supply, and MS contacts 106 close to complete the circuits to relays CR and T1. Relay T2, in parallel with coil 102, also deenergizes, but its contacts T2—A do not close until a preset time period elapses. The contacts T1–A of relay T1 have a preset time period before they open, during which period relay CR is energized and holds its contacts 108, 109 and 110 closed, thereby energizing the brake operating solenoids and bringing the filler, sealing machine, intake star and the conveyor line to a quick stop. This prevents the detected uncapped container from reaching the threading unit. When the time period of contacts T1–A elapses, they open to deenergize relay CR and the contacts 108, 109 and 110 open, thereby deenergizing the brake operating solenoids, while its contacts 111 close to energize the sealing machine brake "off" solenoid. When the time period of contacts T2–A expires, they close to complete the circuits to relay T3 and alarm bell 115. The contacts T3–A of relay T3 have a preset time period before they open and during this period the alarm 115 rings and then shuts off by opening of contacts T3–A.

To restart the line after taking care of the uncapped container, as by removing it, it is necessary to depress the start switch 85, whereupon the circuit operations hereinabove described occur.

Reset switch 83 enables reset of relays 35 and 78 without starting motor 22 whenever testing of the circuits of the detector apparatus may be desired. During operation, however, it will be seen that in case of failure of any of the components of the detector apparatus or loss of power thereto, double-coil relay 35 will drop out or deenergize and open-circuit conductor 74 and relay 78, whereupon line stoppage will be effected, as heretofore described. Thus, positive missing-cap protection is afforded under both operative and break-down conditions of the detector apparatus.

While a detailed description of a preferred embodiment of the invention with respect to its mechanical and electrical construction has been set forth, it should be understood that the details thereof are not intended to be limitative of the invention except insofar as set forth in the accompanying claims.

What is claimed is:

1. Cap detecting apparatus for containers moving in spaced progressive order past a testing station, comprising a power and a dead conductor, relay means operable to control the movement of said containers and including a two-coil relay connected to said dead conductor and having a normally open switch operable to interconnect said conductors, two grid controlled electron tubes respectively connected to said relay coils for controlling energization thereof, a container detector comprising photoconductive cell means and light means therefor at opposite sides of the container path at said station connected to and controlling the potential on the grid of one tube for maintaining it conductive and its relay coil energized until an interposed container darkens said cell means, a cap detector comprising an electronic oscillator having an elongated inductance coil disposed lengthwise in clearance relation to caps on passing containers at said station, said oscillator operating at a normal frequency which is reduced to a lower frequency by the cap on a passing capped container, a circuit connecting said oscillator to the grid of the other tube, a wave trap in said circuit tuned to said normal oscillator frequency to pass a minimum potential to the grid of said other tube and maintain it non-conductive and its relay coil deenergized until said capped container enters under said induction coil to change the oscillator frequency, whereby said wavetrap passes an increased potential which renders said other tube conductive and its relay coil energized, said inductance coil extending forwardly and rearwardly of said cell means whereby off and on operation of said container detector is intermediate the operation of said container detector, and manually operated means for effecting momentary energization of said dead conductor from said power conductor and placing its continued energization under control of said two-coil relay.

2. The detecting apparatus as defined in claim 1 wherein said manually operated means comprises a push switch having normally open contacts connected across said conductors and operable to effect energization of said relay means and interconnection of said conductors through said normally open switch until both of said relay coils become deenergized at the same time.

3. Cap detecting apparatus for containers moving in spaced progression past a test station, comprising a power and a dead conductor, relay means operable to control said container movement and including a two-coil relay having its two coils connected to said dead conductor and a normally open switch operable to interconnect said conductors, push switch means for effecting momentary energization of said dead conductor from said power conductor and placing its continued energization under control of said two-coil relay, two electron tubes, each having a control grid, a cathode and an anode connected to one of said relay coils for controlling its energization, a container detector comprising photo-conductive cell means and light means therefor at opposite sides of the container path at said station connected to and applying positive potential on the grid of one tube for maintaining it conductive and its relay coil energized until a container darkens said cell means, a cap detector comprising an electronic oscillator having an elongated inductance coil disposed closely adjacent above and lengthwise of the container path at said station, said oscillator operating at a normal frequency which is reduced to a lower frequency responsively to a cap coming under said inductance coil, a wave trap connected to receive the oscillation output voltage from said oscillator and impress it on the grid of the other tube and to ground through a parallel connected resistor and rectifier so polarized that positive voltage pulses are impressed on the grid, said wave trap being tuned to said normal oscillator frequency and passing a minimum voltage to the grid of said other tube for maintaining it non-conductive and its relay coil deenergized unless the oscillator frequency is reduced by said cap, whereupon said wave trap passes a greatly increased voltage which renders said other tube conductive and its relay coil energized during traverse of said inductance coil by the cap, said inductance coil extending substantially equally forwardly and rearwardly of said cell means sufficiently for off and on operation of said container detector intermediate the operation of said cap detector, and biasing means for said other tube comprising a Zener diode and series resistance connecting its cathode to ground for preventing conduction of said other tube until substantially maximum increased voltage appears on its grid responsively to said cap coming under said inductance coil.

4. A cap detecting apparatus for containers moving in spaced progression past a test station, comprising an epoxy resin detector head at said station overlying the travel path of the containers, relay means remote from said head operable to control container movement past said head and including a two-coil relay and a normally open switch which is held closed so long as either of said coils is energized, two grid controlled vacuum tubes, each having an output circuit connected to one of said coils and to a power source through said switch, photo-conductive cell means and light means therefor mounted on the underside of said head at opposite sides of the container path, a circuit connecting said cell means across said power source through a potentiometer having a slide contact connected to the grid of one of said tubes so that with light shining on said cell means sufficient positive potential is impressed on the grid to maintain said one tube conductive and its relay coil energized until an interposed container darkens said cell means, means for effecting initial energization of said two-coil relay and closure of its said normally open switch, an electronic oscillator sealed within said head and having an elongated inductance coil disposed closely adjacent above and lengthwise of the container path, said oscillator operating at a normal frequency which is reduced to a lower frequency by the change in inductance of said elongated coil by a cap on a container as such cap traverses the coil length, a wave trap connected to the grid of the other tube, and to said oscillator through a shielded conductor, said wave trap being tuned to said normal oscillator frequency to pass a minimum voltage to the grid of said other tube which maintains it non-conducting and its relay coil deenergized unless said interposed container carries a cap to cooperate with said inductance coil and change the oscillator frequency, whereupon the wave trap passes increased grid voltage which renders said other tube conductive and its relay coil energized, said inductance coil extending substantially equally forwardly and rearwardly of said cell means sufficiently to cause off and on operation of said one tube intermediate the operation of said other tube, if a cap is present on the container passing said head.

5. A cap detector for containers moving in spaced progression past a test station, comprising relay means controlling said container movement and including a two-coil relay having a normally open switch which is held closed so long as either of said coils is energized, a normally conductive vacuum tube having a control grid and an output circuit connected to one of said coils and through said switch to a D.C. power source, a container detector comprising a pair of parallel connected photo-conductive cells alongside each other and individual light sources therefor at opposite sides of the container path at said test station, said cells being connected to said power source and to said control grid through a voltage dropping resistor for impressing control potential on said grid sufficient to maintain said tube conductive until an interposed container darkens both cells, whereupon said tube becomes non-conducting and said one relay coil deenergizes, a second normally non-conducting vacuum tube having a control grid and an output circuit connected to the other of said coils and through said switch to said power source, a cap detector comprising an electronic oscillator energized from said power source and including an elongated inductance coil disposed closely adjacent above the container path at said test station for lengthwise traverse by the caps on passing containers, said oscillator operating at a normal frequency when no containers pass said test station and at a reduced frequency when a capped container brings its cap under said inductance coil, a wave trap connected to said oscillator and to the grid of said second tube, means for tuning said wave trap to said normal oscillator frequency to provide a minimum output potential which is increased to a maximum value when said oscillator frequency is reduced, whereby said second tube is rendered conductive and energizes said other relay coil, said inductance coil having a length approximately equal to the container diameter plus the center-to-center distance between said photo-cells for reduced inter-turn capacitance and oscillator operation at optimum normal frequency, and extending forwardly and rearwardly substantially equally from the midpoint between said photo-cells for causing a passing capped container to effect off and on operation of said container detector after its cap comes substantially fully under said inductance coil, and means for effecting initial energization of said two-coil relay for subsequent opening of said switch thereof only when both of its two coils become deenergized at the same time.

6. In apparatus for detecting the absence of metal caps from filled containers such as glass containers, moving in spaced relation past a test station, a two-coil relay, a cap detector at said station comprising a high frequency electronic tube oscillator having an elongated inductance coil disposed lengthwise of and closely adjacent above the top level of passing containers, said oscillator operating at a normal frequency which is reduced to a lower frequency by a cap coming under said inductance coil and maintained at said lower frequency for the duration of the cap's movement thereunder, a wavetrap connected to said oscillator and tuned to resonance at said normal frequency to provide a low level output voltage that increases to a high level when said lower frequency appears, means comprising a triode vacuum tube responsive to said output voltage levels of said wavetrap for changing the electrical condition of one of said relay coils from a deenergized state to an energized state for the duration of said high level output, a light-sensitive device and a source of light therefor at opposite sides of the container path at said station providing a high voltage output until an interposed container darkens said device in passing and reduces its output, means including a second triode vacuum tube responsive to said high voltage output for maintaining the other of said relay coils normally energized until said device becomes darkened, said inductance coil extending substantially equally forwardly and rearwardly of said device sufficiently to permit a capped container to bring its cap substantially fully thereunder for detection of such cap before such container darkens said device and to restore light to said device before such cap effectively passes beyond said induction coil, and means controlled by said relay for terminating container movement when an uncapped container is detected at said station.

7. In an apparatus as defined in claim 6 wherein a pair of parallel connected light-sensitive devices and light sources therefor is provided, with said devices alongside of each other so that other relay coil is maintained energized until both devices become darkened, and the length of said inductance coil being approximately equal to the container diameter plus the center-to-center distance between said devices for reduced inter-turn capacitance and oscillator operation at optimum normal frequency, thereby affording effective and positive detection of caps of non-magnetic metal.

References Cited in the file of this patent

UNITED STATES PATENTS

| | | |
|---|---|---|
| 2,472,945 | Gingrich | June 14, 1949 |
| 2,800,226 | Drennan | July 23, 1957 |
| 2,883,538 | Elam | Apr. 21, 1959 |